Aug. 19, 1969 J. L. JENKINS 3,462,590
CORRELATOR FOR TWO-LEVEL QUANTIZED DIGITAL SIGNALS
Filed Jan. 10, 1967
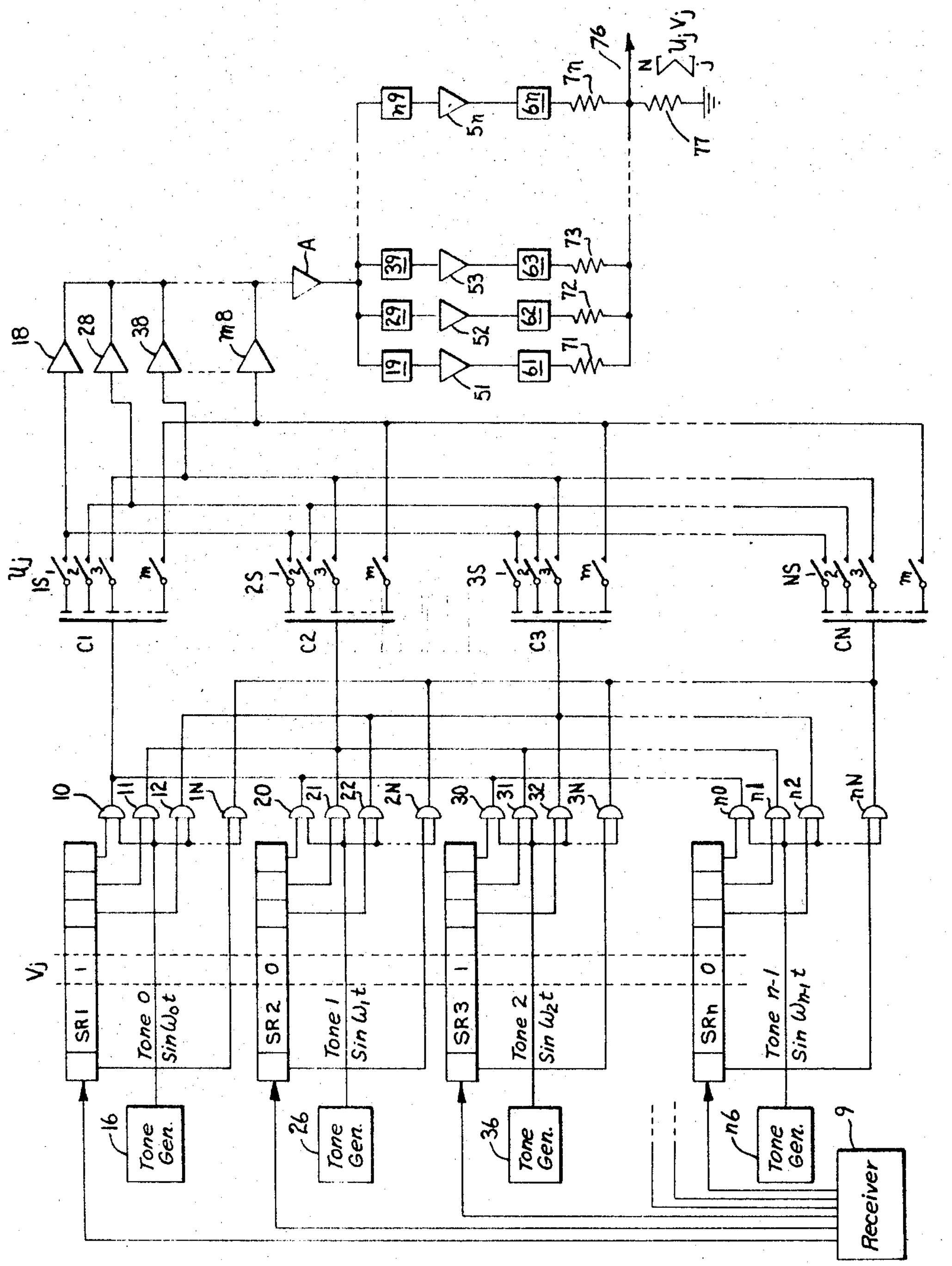
INVENTOR.
JAMES L JENKINS
BY H. H. Losche
Attorney

United States Patent Office 3,462,590
Patented Aug. 19, 1969

3,462,590

CORRELATOR FOR TWO-LEVEL QUANTIZED DIGITAL SIGNALS

James L. Jenkins, Baltimore, Md., assignor, by mesne assignments, to the United States of America as represented by the Secretary of the Navy Filed Jan. 10, 1967, Ser. No. 608,450
Int. Cl. G06f *15/34*
U.S. Cl. 235—181 6 Claims

ABSTRACT OF THE DISCLOSURE

A correlator circuit for two-level quantized digital signals using tones as an input to "and" gates to which are also applied shift register digital outputs produced by receiver signals and channeled by tone filters and summed to quantize the received target signals.

In an automatic tracking system of an object detecting system, such as an active sonar system, it is necessary to formulate a design for a correlation detector to operate on signals which are quantized into $r$ levels ($r>2$) in order to estimate the complexity of such a system, compared with the two-level (polarity only) processing normally used in the automatic tracking design. The critical unit in such a design is the multiplier necessary to multiply one $\log_2 (r)$ [log to the base 2 of $m$ or $\log_2 (m)$]—digit number by another. This increases the complexity by a factor of $[\log_2 (r)]^2$, which is the factor for storage and other components of the correlator, if conventional techniques are used, and may not be feasible in terms of present techniques, for compressed time sample rates of $\approx 20$ megacycles per second.

Background of the invention

In the present invention a correlator circuit device is used to multiply each of a sequence of n-bit numbers (where $n=\log_2 r$) by numbers in fixed sequence of numbers (i.e., the "stored reference" signal of the correlator) and adds the resulting sequence of products. In other words, it computes:

$$\Sigma_j u_j v_j \qquad (1)$$

where $u_j$ and $v_j$ are $\log_2 (r)$ bit numbers, i.e., a number having $[\log_2 (r)]$ bits. The individual products, e.g., $u_j v_j$, are not explicitly computed, nor are they necessary. The time consumed by the process is potentially very short compared with the time required using conventional techniques. The correlator circuit uses a plurality of shift registers (SR), each digit or bit output of each (SR) being used as a controlling signal to a two-input "and" or coincidence gate. The other input to each gate of one SR is from a tone generator, there being as many tone generators of distinct tones as there are shift registers. The outputs of the gates of corresponding digits of each SR are coupled by capacitor couplings through multiplier switches to ones, twos, fours, etc., channels connected to a parallel network having tone filter channels to pass each of the original tones in separate channels where the tones are scaled and envelope detected for analog voltage summation providing the summation of Expression 1. It is therefore a general object of this invention to provide a single computing correlator circuit used to operate independently and simultaneously upon the separate digits of N distinct n-digit binary representations of quantities $v_j$, where $$j=1, 2, 4 \ldots N$$

each represented by $n$ distinct tones by multiplying each of these N quantities by one of N other distinct m-bit quantities $u_j$, where again $$j=1, 2, 4 \ldots N$$

to produce the sum of products $$\sum_j^N u_i v_i$$

in analog voltage in correspondence with the multiplied digits.

Brief description of the drawing

These and other objects and the attendant advantages, features, and uses will become apparent to those skilled in the art as the description proceeds when considered along with the single figure of drawing.

Description of the preferred embodiment

Referring more particularly to the figure, a receiver 9, such as a digital receiver for an active sonar system for example, has outputs coupled to shift registers SR1, SR2, SR3 . . . SR$n$ bits to place digital words therein in accordance with received range or other signal information. Let these words represent multiplicands $v_i$ in $$\sum_j^N u_i v_i$$

where the SR's must be N bits long, i.e., contain as many stages as there are multiplicands $v_i$ in $$\sum_j^N u_i v_i$$

The K$^{th}$ multiplicand has $n$ bits, the bit representing $2^j$ appearing in the K$^{th}$ position of the $j^{th}$ SR $$K=1, 2 \ldots N$$
$$j=1, 2, \ldots N$$

The SR digital words constitute the inputs to this system. Each SR has the "1" state output of each digit or bit thereof coupled as one input to an AND coincidence gate; that is, SR1 has the first bit "1" state output coupled to gate 10, the second to gate 11, the third to gate 12, and so one to 1N until each bit is coupled to a gate. The same coupling is made for SH2 and AND gates 20, 21, 22 . . . 2N, for SR3 and gates 30, 31, 32 . . . 3N, and for the remainder through SR$n$. The other input to each AND coincidence gate is from a tone generator in the manner that tone generator 16 is coupled in parallel to all AND gates of SR1; tone generator 26 is coupled in parallel to all AND gates of SR2; and so on for the tone generator of tone N–1 designated N6 for the AND gates of SR$n$. Tone generators 16, 26, 36 . . . N6 are each of separate distinct tones represented as $\sin w_0 t$, $\sin w_1 t$, $\sin w_2 t \ldots \sin w_{n-1} t$. The outputs of AND coincidence gates 10, 20, 30, . . . $n$0 are coupled in common to one plate of a coupling capacitor C1; the outputs of AND gates 11, 21, 31 . . . $n$1 are coupled in common to one plate of a coupling capacitor C2; and, in like manner for the remaining couplings, it being understood that the coupling capacitors C1, C2, C3 . . . CN correspond to the first, second, third . . . and last stages of all SR's. The input plate of each capacitor carries a tone representation of one multiplicand. The output side of each capacitor has as many output plates as the multiplier has 1s in its binary representation; that is, the plates (1's) or lack of them (0's) on the output side, are binary representations of the multipliers. This representation can be made more flexible by using switches (electronic or manual) as indicated in the figure by 1S, 2S, 3S . . . NS. In this case the number of output plates of each capacitor$=m$, representing the number of binary digits of the multipliers. Each corresponding output plate is coupled in common to a stored multiplier channel 18, 28, 38 . . . *m*8 (where the multipliers have $m$ binary digits), as illustrated in the drawing. The multiplier channels have amplifiers with gains of 1, 2, 4, 8, etc., t0 $2^{m-1}$ ($m$ not necessarily$=n$). The outputs of all multiplier channels are coupled in common to tone channels, each tone channel having a tone filter 19, 29, 39 . . . *n*9, a tone scaling amplifier 51, 52, 53 . . . 5*n*, an envelope detector 61, 62, 63 . . . 6*n*, and a resistor 71, 72, 73 . . . 7*n*. Tone channel 19, 51, 61, 71 filters in only tone 0, tone channel 29, 52, 62, 72 filters in only tone 1, and so on for the remainder of tone channels. The output leads of all resistors are coupled in common to an output lead 76 to develop the summed analog voltage across a resistor 77 having one end coupled to a fixed zero potential, such as ground. The tone scaling amplifiers 51, 52, 53 . . . 5*n* have amplifier gains in the order of $2^0, 2^1, 2^2 \ldots 2^{n-1}$ and the envelope detectors 61, 62, 63 . . . 6*n* each detect the voltage amplitude produced by the preceding tone scaling amplifier. The output 76 provides the summed analog voltage of Expression 1, as will soon be shown by way of example.

Operation

Where N n-bit numbers $v_j$, where $j=1, 2, 4 \ldots N$ are stored in the N-bit shift registers SR1, SR2 . . . SR*n*, and when N other m-bit numbers $u_j$ have been set into the switches 1S, 2S, 3S . . . NS at the $m$ output plates of each capacitors C1, C2 . . . CN then the device upon being actuated, will produce, when transients have died out, a steady-state DC voltage proportional to the sum of products:

$$\sum_{j=1}^{N} u_j v_j$$

To see how this comes about, let it be assumed that the receiver has sampled and quantized into $2^n$ levels the received signal and encoded the consecutively-received samples into a sequence of n-bit binary numbers. The most recent N of these are stored in the shift registers SR1–SR*n*, all the most significant digits in SR*n*, the least significant in SR1, and the $j^{th}$ received sample $v_j$ in the $j^{th}$ position of each SR, the position of $v_j$ being indicated by dotted lines in the figure, and is equal to 00101 for an example herein. A good method (based on hypothesis testing) of testing whether a signal whose sample values are given by a sequence of numbers $u_j$, where $j=1, 2, 4 \ldots N$ is actually present in the receiver input, is to compute the quantity $$\sum_{j=1}^{N} u_j v_j$$

Suppose that $u_j$ is the binary number 11001; then this number should be set into the switches denoted by 3S1, 3, $m$, in the output plates of the capacitor to which the $j^{th}$ digit will be coupled and referred to as $C_j$. All the remaining $N-1$ values of $u$ should be similarly set into the appropriate capacitor switches. It will be seen that due to the gating arrangement, the tone representation:

$$v_j=0 \sin w_{m-1}t+0 \sin w_{m-2}t+ \sin w_2t +0 \sin w_1t+1 \sin w_0t$$

of $v_j$, 00101, will appear on the input buss to the capacitor representing $u_j$, the capacitor $C_j$ and switches 3S. The summing and scaling amplifiers 18–*m*8 will either multiply the tone representation of $v_j$ by $2^{m-1}$ or not, depending on the most significant digit of $u_j$ (i.e., whether the $m^{th}$ digit switch is open or closed). In this case the digit is $j$, the switches 3S1, 4, 5, are closed, and the output of $m_j$ is proportional to $$2^{m-1}(v_j)=2^{m-1}(0+0+\sin w_2t+0+\sin w_0t)$$

Analogously the other outputs are as follows (note $m=5$ in the example).

Amplifiers:

| | |
|---|---|
| *m***8** | $1\times2^{m-1}(v_j)$ |
| *m***18** | $1\times2^{m-2}(v_j)$ |
| *m***28** | $0\times2^{m-3}(v_j)$ |
| **28** | $0\times2^1(v_j)$ |
| **18** | $1\times2^0(v_j)$ |

The output of the summing amplifier A is then $$2^{m-1}(v_j)+2^{m-2}(v_j)+0+0+2^0(v_j)$$

This is in accordance with the binary numerical identity:

$$u_jv_j=(11001)v_j=[1\times2^4+1\times2^3+0\times2^2+0\times2^1+1\times2^0v_j$$

$v_j$ is still in tone representation and its component sin $w_{m-1}$, if any, will be ushered into the channel guarded by filter *n*9, envelope detected and the results multiplied by $2^{n-1}$. When $v_j=00101$ as in this example, there is no such component; in fact, the only two components are:

$$[2^4+2^3+0+0+2^0] \sin w_2t$$

and $$[2^4+2^3+0+0+2^0] \sin w_0t$$

which are ushered respectively into channels 39 and 19, respectively, and multiplied respectively by $2^2$ and $2^0$, producing $$[2^4+2^3+0+0+2^0]2^2+[2^4+2^3+0+0+2^0]2^0$$
$$=2^6+2^5+0+0+2^2+2^4+2^3+0+0+2^0$$
$$=2^6+2^5+2^4+2^3+2^2+0+2^0$$

which is the result obtained by multiplying out:

```
  11001
  00101
  11001
11001
1111101
```

The fact that other numbers $v_i (i\neq j)$ are stored in other digits of the SR's, and are being operated upon by other numbers $u_i, (i\neq j)$ set in the outputs of capacitors $C_i$, $(i\neq j)$ simultaneously in exactly the same way as described above for the $j^{th}$ pair, $u_i$, $v_i$, does not affect the operation of the $j^{th}$ pair, nor is it affected by it. Consequently, when transients have died away, the output will be a voltage proportional to the sum of products $u_jv_j$, as claimed until the output is $$\sum_{j}^{N} u_j v_j$$

Note that the capacitor is merely a method of AC coupling a single input uniformly to $m$ outputs, and could be inductive as well as capacitive. At the moment, capacitive coupling seems to be more adapted to printing and etching techniques.

To complete the description of the correlation receiver (in the context of which the operation of the device was described) it is only necessary to note that having computed $$\sum_{j=1}^{N} u_j v_j$$

the oldest signal sample $v_1$ as described by shifting out of the register, each $v_j$ is shifted to the left, and the nearest measured, quantized and encoded receiver sample $v_{n+1}$ is recorded in the rightmost position and the device is ready to operate again, to produce:

$$\sum_{j=1}^{N} v_{j+1} u_j$$

As the process continues, it will be seen that the output is the discrete approximation to the cross correlation function of the stored reference $u_j$ and the input signal $v_j$, produced on the output 76 as an analog voltage.

Many modifications and changes may be made in the constructional details and features to the preferred embodiment shown and described herein within the spirit of the conceived invention.

I claim:

1. A correlator for two level quantized digital signals comprising:

a plurality of shift registers each having N digits and each digit having a one-state digital output;

a signal intelligence input to all shift registers to establish digital words therein and to shift same;

an AND gate coupled respectively to each N digit one-state output for each shift register, each digit group of AND gates coupled to corresponding digit one-state outputs of all shift registers having outputs coupled in common;

a tone signal generator corresponding to each shift register, each producing a different tone signal with the output of each being coupled in common as the second input to the AND gates of the corresponding shift register;

a plurality of coupling means each having a single input and a plurality of outputs with the input of each coupled respectively to the common output of said AND gate digit groups thereby corresponding in number to said N digits;

switching means in said plurality of outputs of each said coupling means, said switching means of corresponding coupling means outputs being coupled in common;

an amplifier coupled to each common coupled switch output, said amplifiers having a relation of amplification factors in the order of $2^0, 2^1, 2^2 \ldots 2^{m-1}$ to amplify said tone signals in this digital sequence, the output of said amplifiers being coupled in common; and a plurality of channels coupled to said common amplifiers output and including means to filter said tone signals into the channel of the original tone signal, to amplify said tone signals in accordance with the amplification factors of $2^0, 2^1, 2^2 \ldots 2^{m-1}$, and to amplitude envelope detect each tone signal in each channel and couple the outputs in common to provide an analog voltage representation of a correlation of two level quantized digital signal multiplied by a digital factor in accordance with the continuity of said switches to arrive at correlation when said amplitude is a maximum.

2. A correlator for two level quantized digital signals as set forth in claim 1 wherein:

said each digit group of AND gates is coupled respectively to 1's, 2's, 4's . . . N one state digit output, the corresponding digit of each shift register is selectable as a multiplicand factor in said correlator, and said switching means constitute a multiplier factor.

3. A correlator for two level quantized digital signals as set forth in claim 2 wherein:

said means to filter said tone signals are tone separation filters, said filtered tone corresponding to the tone of the first shift register being amplified by said factor $2^0$, the filtered tone corresponding to the tone of the second shift register being amplified by said factor $2^1$, and so on for all tones.

4. A correlator for level quantized digital signals as set forth in claim 3 wherein:

said plurality of coupling means are capacitors.

5. A correlator for two level quantized digital signals as set forth in claim 4 wherein:

said means to amplify said tone signals in said channels are tone scaling amplifiers for said amplification factors of $2^0, 2^1, 2^2 \ldots 2^{m-1}$.

6. A correlator for two level quantized digital signals as set forth in claim 5 wherein:

said plurality of outputs of said coupling capacitors constitute *m* number, the selected switches of said switching means constituting the multiplier taken from said *m* number.

References Cited

UNITED STATES PATENTS 3,407,289 10/1968 Williams ---------- 235—150.5
3,412,334 11/1968 Whitaker --------- 235—181 X MALCOLM A. MORRISON, Primary Examiner F. D. GRUBER, Assistant Examiner U.S. Cl. X.R.

235—150.5, 164, 181, 194; 340—347